CROSS REFERENCE SEARCH ROOM

[redacted]

fw/
T 856, 011

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 5, 1968

856 O.G. 5

656,369

STABILIZED ETHYLENE SULFIDE POLYMERS

Ephraim H. Catsiff, Trenton, N.J., assignor to Thiokol Chemical Corporation, Bristol, Pa., a corporation of Delaware

Filed July 27, 1967. Published Nov. 5, 1968
Class 260—18
No Drawing. 17 Pages Specification

Thermal degradation is prevented during the high temperature processing of solid, high molecular weight ethylene sulfide homo-, co-, or inter-polymers by the addition of .1 to 10% by weight of (a) a tin compound such as tetrahydrocarbyltin, trihydrocarbyltin hydroxides, dihydrocarbyltin oxides, hydrocarbylstannoic acids and salts thereof, dihydrocarbyltin mercaptoesters, $Sn^{II}$ esters of mono-, and polycarboxylic acids, $Sn^{IV}$ acetylacetonates, phenolates and alcoholates; .5 to 3% by weight of (b) a rosin compound which is either modified, unmodified, or a derivative; and optionally .05 to 5% by weight of a weak base.

[redacted]